United States Patent [19]

Warner

[11] Patent Number: 5,434,979
[45] Date of Patent: Jul. 18, 1995

[54] DISK DRIVE CONTROLLER

[75] Inventor: Nicholas M. Warner, Livermore, Calif.

[73] Assignee: Unisys Corporation, Blue Bell, Pa.

[21] Appl. No.: 455,877

[22] Filed: Dec. 28, 1989

Related U.S. Application Data

[63] Continuation of Ser. No. 19,819, Feb. 27, 1987, abandoned.

[51] Int. Cl.⁶ .............................................. G06F 13/00
[52] U.S. Cl. ................................................. 395/250
[58] Field of Search ................ 364/200, 900; 395/250, 395/275, 425

[56]     References Cited
    U.S. PATENT DOCUMENTS

| | | | |
|---|---|---|---|
| 3,774,165 | 11/1973 | McCann, Jr. et al. | 395/425 |
| 3,995,253 | 11/1976 | Morrin, II et al. | 395/425 |
| 4,016,541 | 4/1977 | Delagi et al. | 364/200 |
| 4,357,657 | 11/1982 | Fellinger | 364/200 |
| 4,488,223 | 12/1984 | Chiwaki | 395/425 |
| 4,490,784 | 12/1984 | Ives et al. | 364/200 |
| 4,509,115 | 4/1985 | Manton et al. | 364/200 |
| 4,527,233 | 7/1985 | Ambrosius, III et al. | 364/200 |
| 4,545,014 | 10/1985 | Oguchi | 395/425 |
| 4,747,038 | 5/1988 | Bradley et al. | 364/200 |
| 4,835,738 | 5/1989 | Niehaus et al. | 364/900 |
| 5,038,282 | 8/1991 | Gilbert et al. | 395/200 |
| 5,079,694 | 1/1992 | Nakagawa et al. | 395/425 |

Primary Examiner—Vincent N. Trans
Attorney, Agent, or Firm—John J. McCormack; Mark T. Starr

[57]      ABSTRACT

In a disk drive control stage, data written by a microprocessor to a register (or read by a microprocessor from a register) is automatically "imaged" in a RAM location reserved for that register.

24 Claims, 9 Drawing Sheets

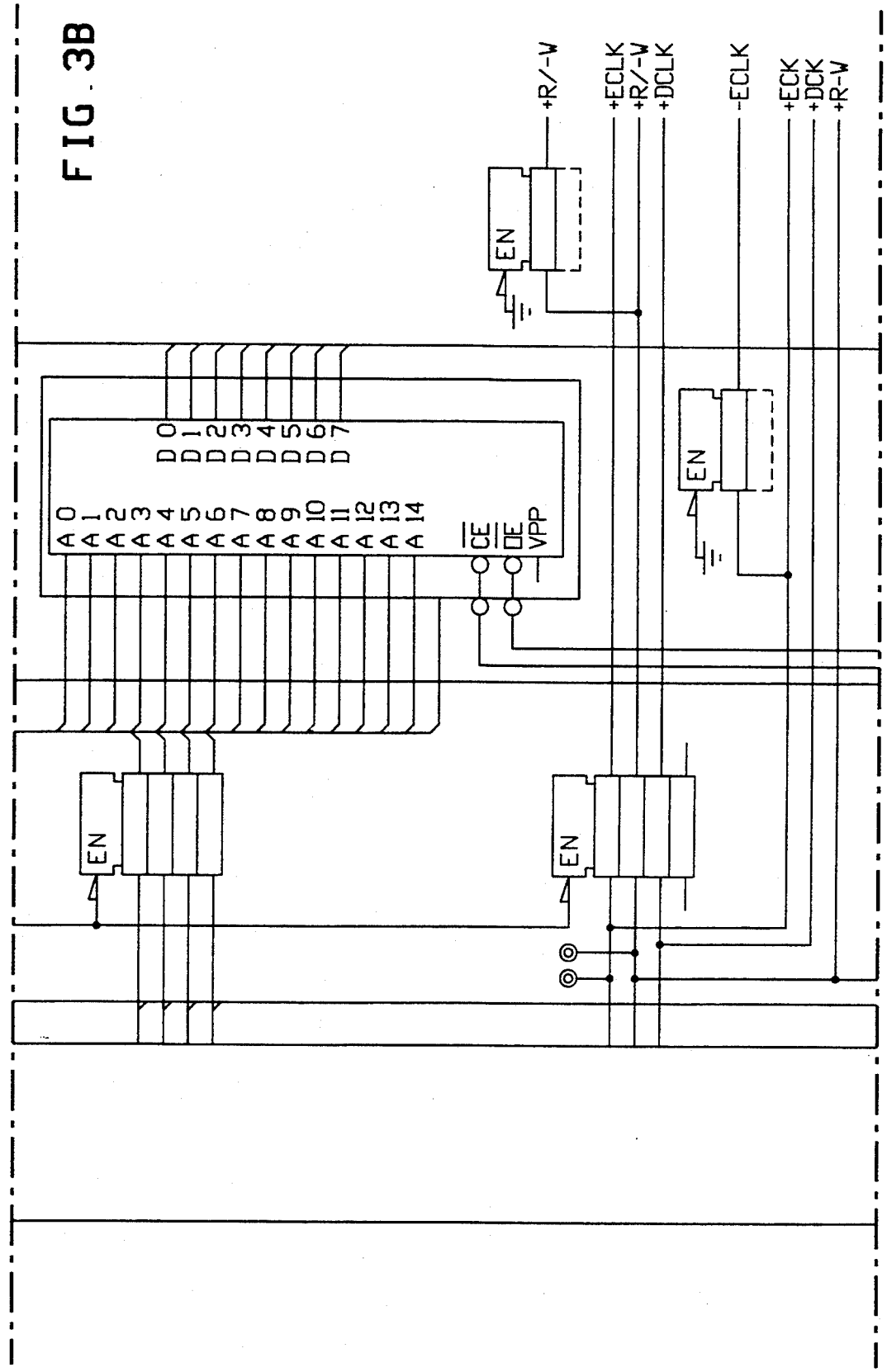

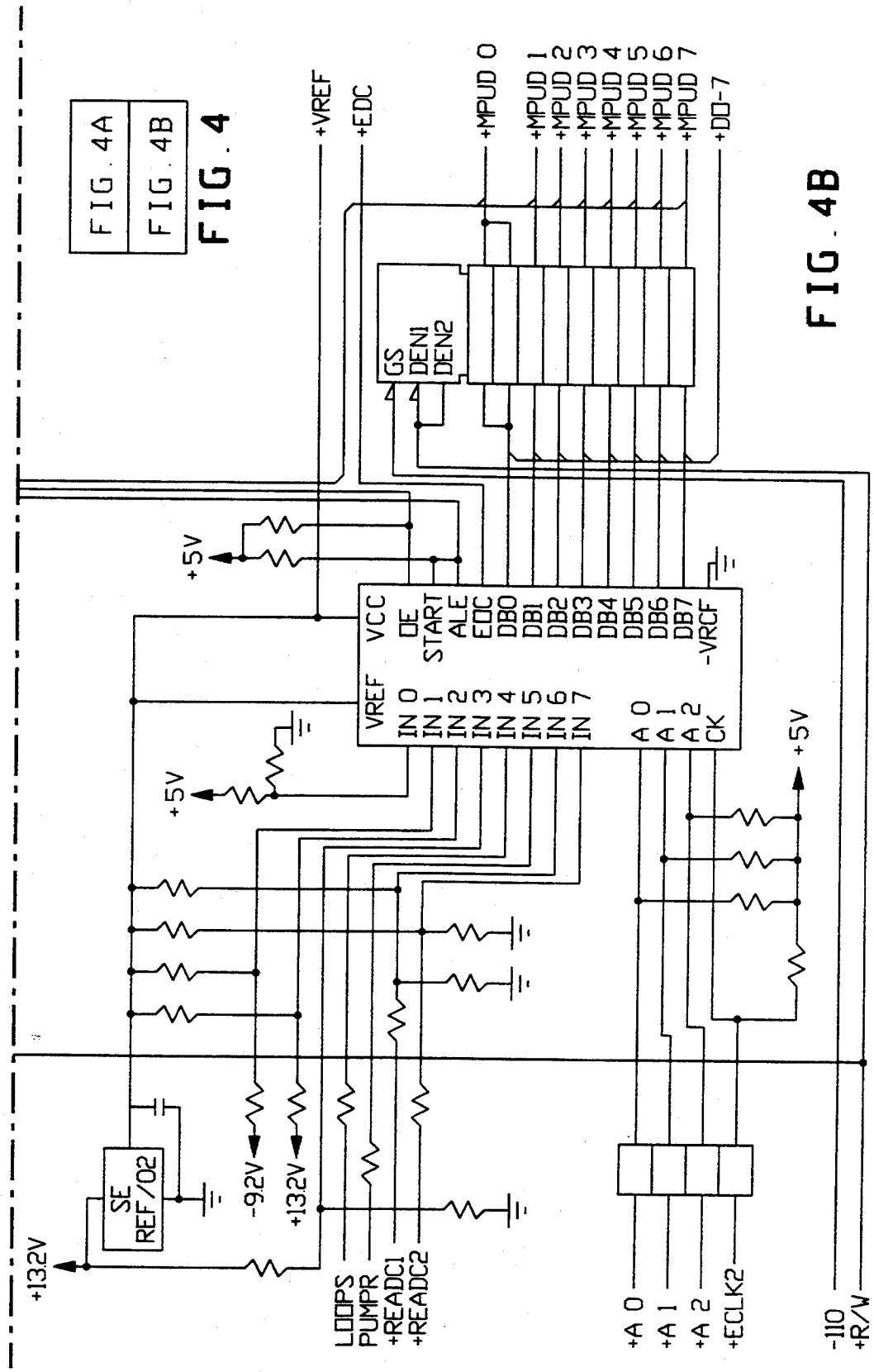

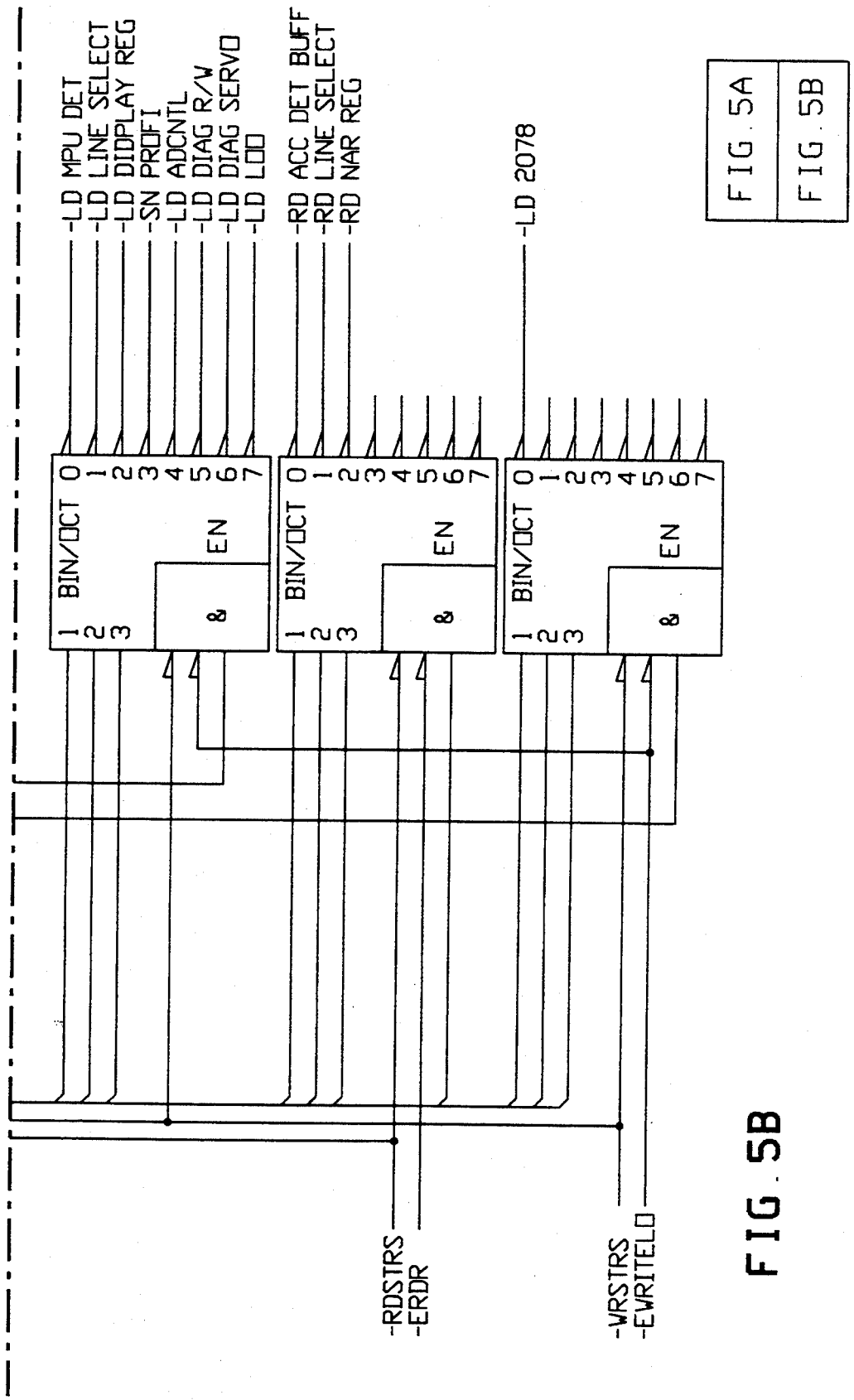

DISK DRIVE CONTROLLER

This application is a continuation of Patent Application Ser. No. 019,819 filed Feb. 27, 1987 now abandoned.

The purpose of this invention is to enable disk drive data written to an output register to be examined after the "write" has occurred. Additionally, the invention allows data from a previous "read" of an input register to be examined. Input and output registers are used in electronic controllers for modifying or monitoring the behavior of a controlled machine. Frequently the next action of the controller depends upon the current state of one or more of its output registers.

OLD METHODS

Two existing methods are in general use:
(1) Additional logic is added to an output register to allow the output of the register to be read back.
(2) The controller stores an image of the data written to the output register. The image is stored in RAM using additional controller instructions after the data has been written to the output register.

DISADVANTAGES OF OLD METHODS

Old method (1) adds complexity to the machine because each output register must have an input register added to it so that the output can be read. This additional complexity reduces the machine reliability. Old method (2) adds complexity to the machine because the control program must include additional instructions to store the image of the data. This reduces the performance of the machine because the time taken to store the image of the data is additional overhead. The design of the control program is an error-prone process; typically an output register may be altered in several places in the control program; the extra instructions required to store the image of the data may be omitted from one or more of these places. The image of the data stored in RAM will then not be the same as the output register contents.

ADVANTAGES OF THIS INVENTION

This invention does not require the additional input registers of old method (1) because it uses a RAM to store images of the data written to the output registers [note: most controllers already include a suitable Ram Device]. The invention does not require the additional instructions in the control program of method (2) because the controller logic is designed so that a write-operation to an output register results in a simultaneous write-operation to a corresponding RAM location.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements.

DESCRIPTION OF THE PREFERRED EMBODIMENT

Figure 2:
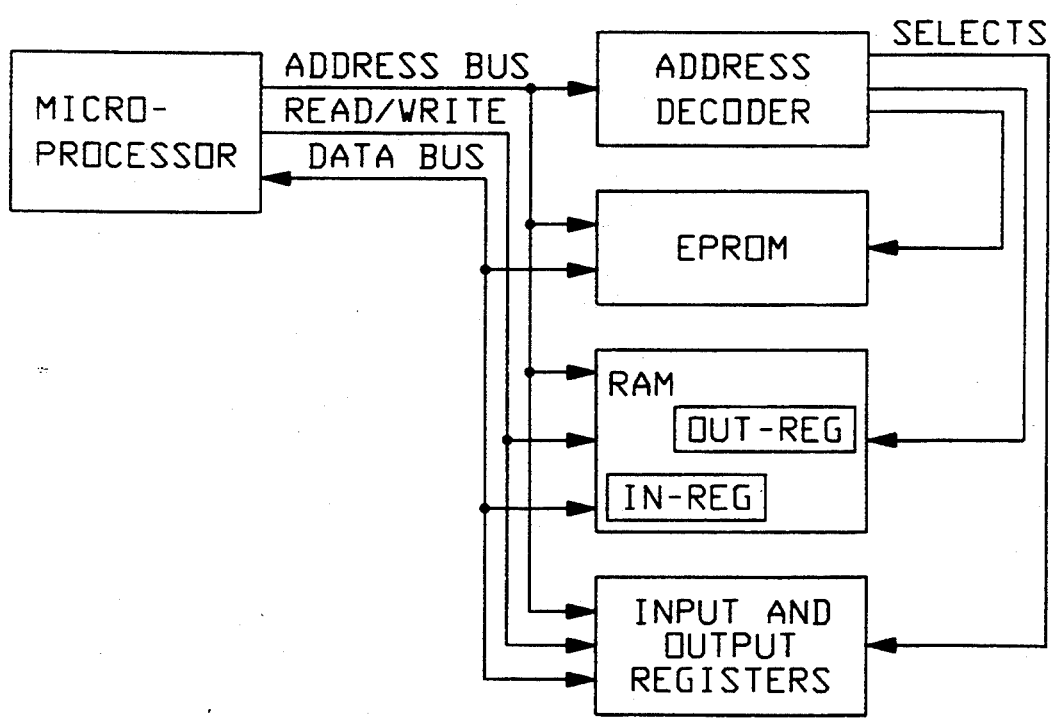
FIGS. 2–5 are more detailed circuit diagrams of a modified controller embodiment of the type in FIG. 2.
Figure 3C:
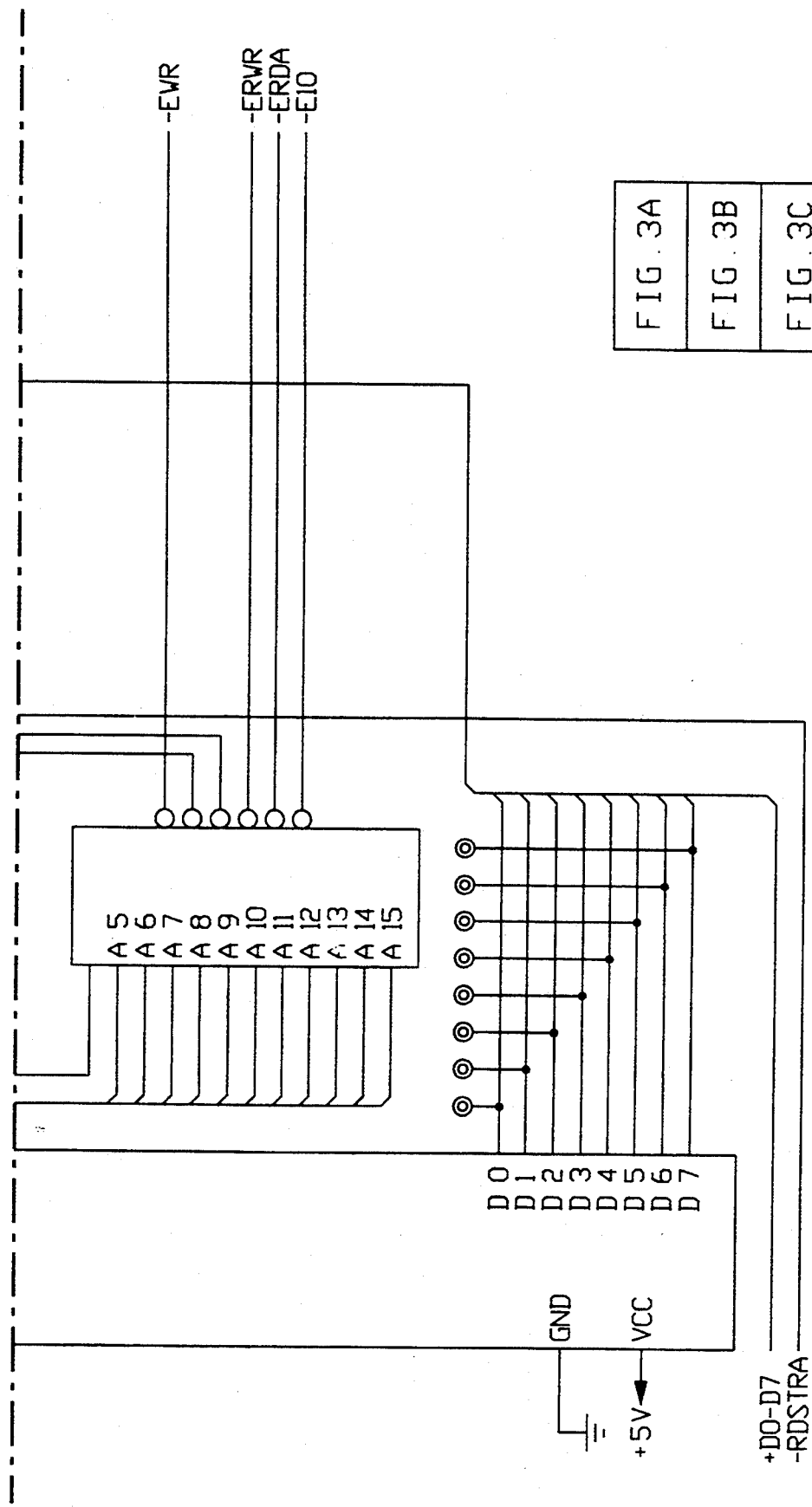
Figure 3A:
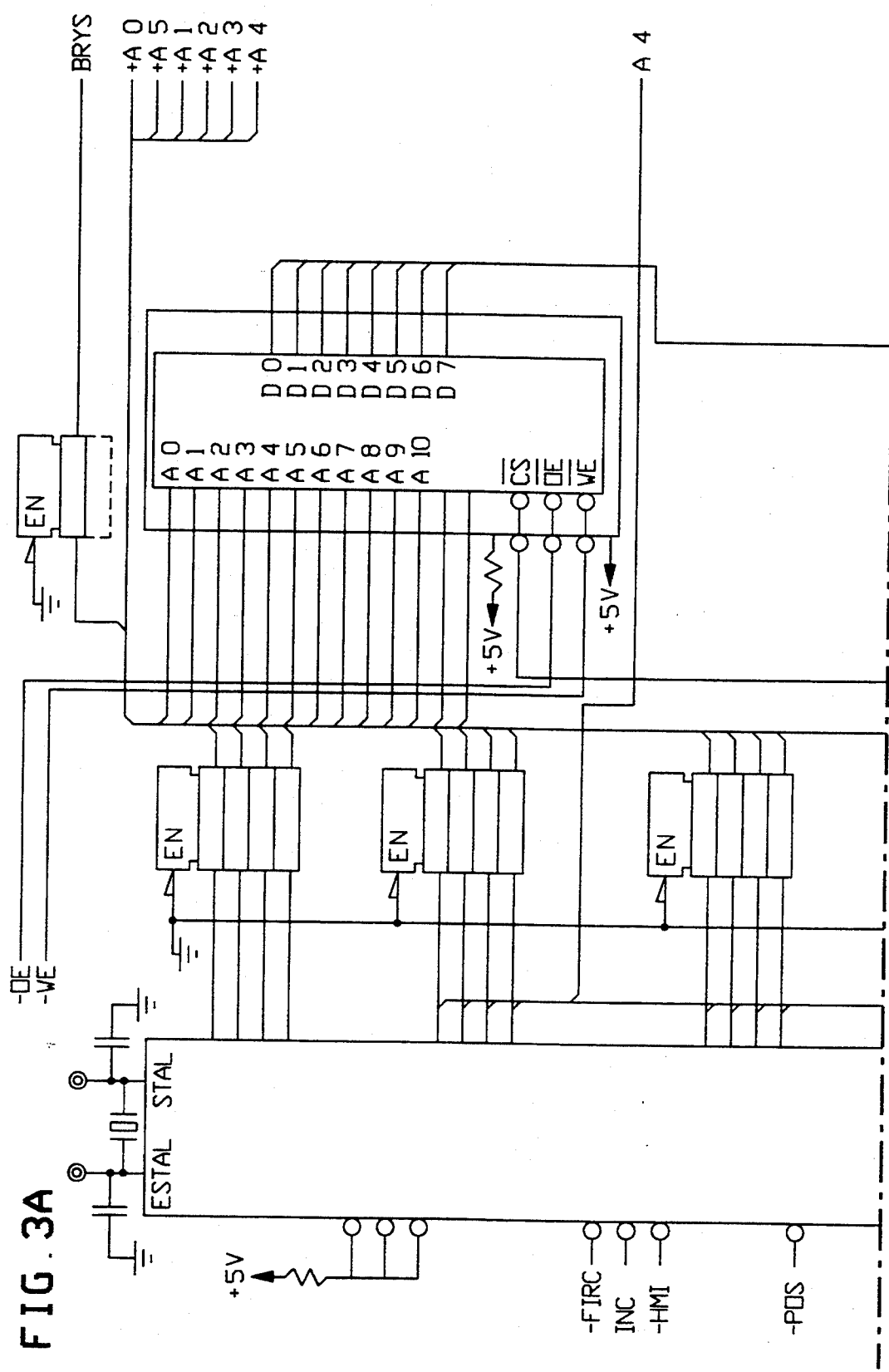
Figure 4A:
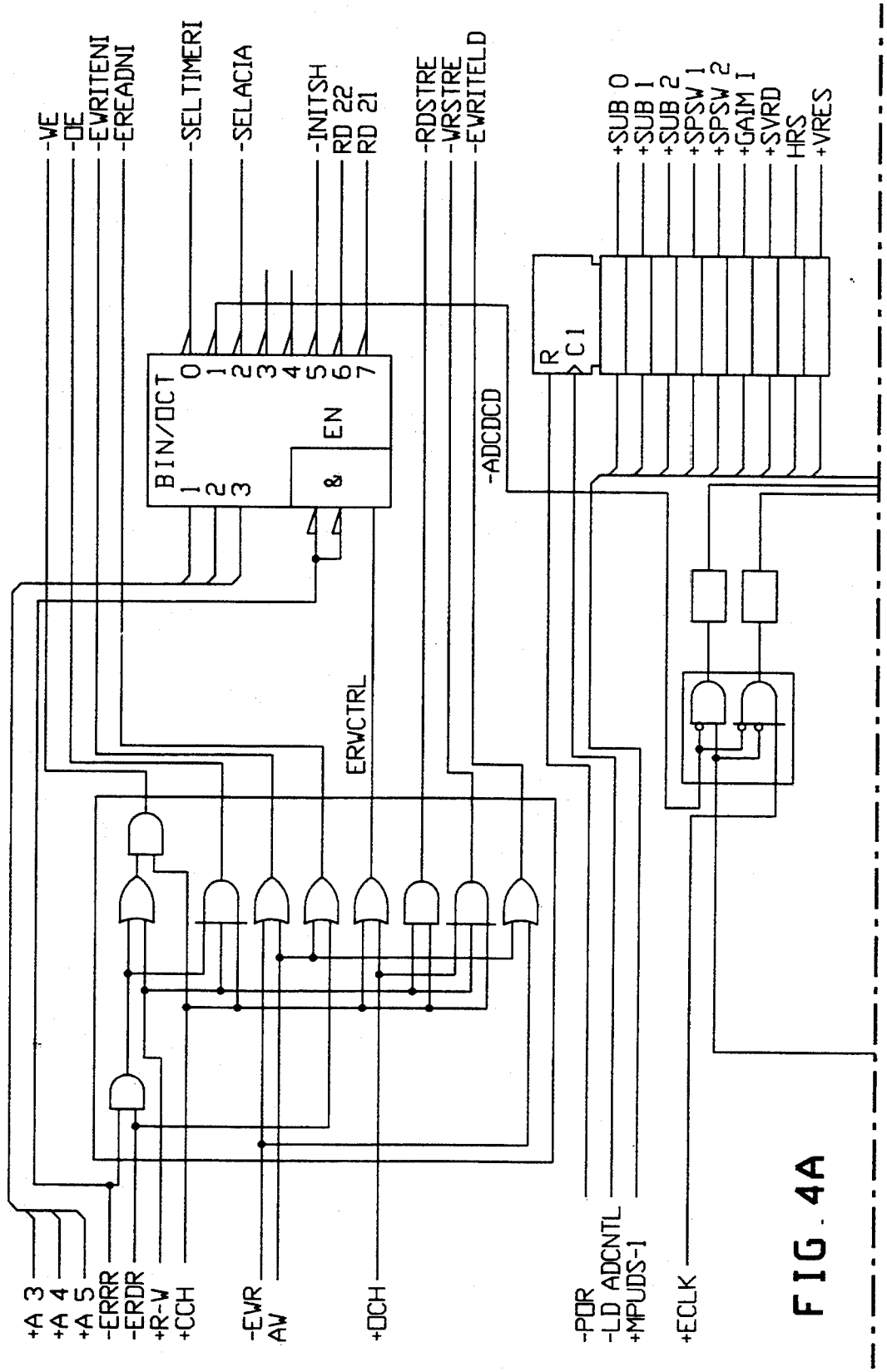
Figure 5A:
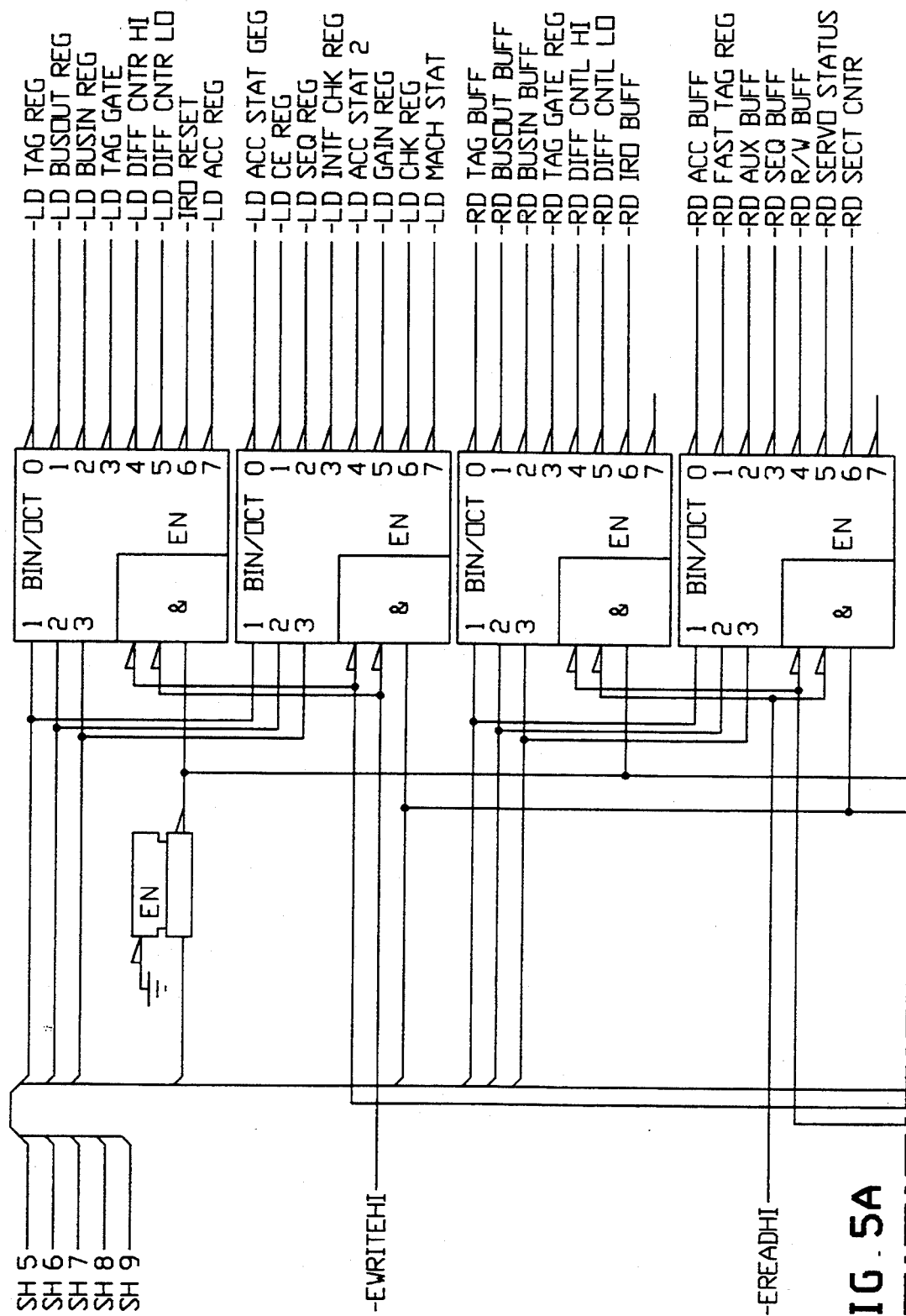

General description, background:

FIG. 2 schematically illustrates a disk drive controller embodiment constructed according to principles of this invention (implemented in the circuits of FIGS. 3–5) This, and other means discussed herein, will generally be understood as constructed and operating as presently known in the art, except where otherwise specified. And, except as otherwise specified, all materials, methods and devices and apparatus herein will be understood as implemented by known expedients according to present good practice.

Figure 1:
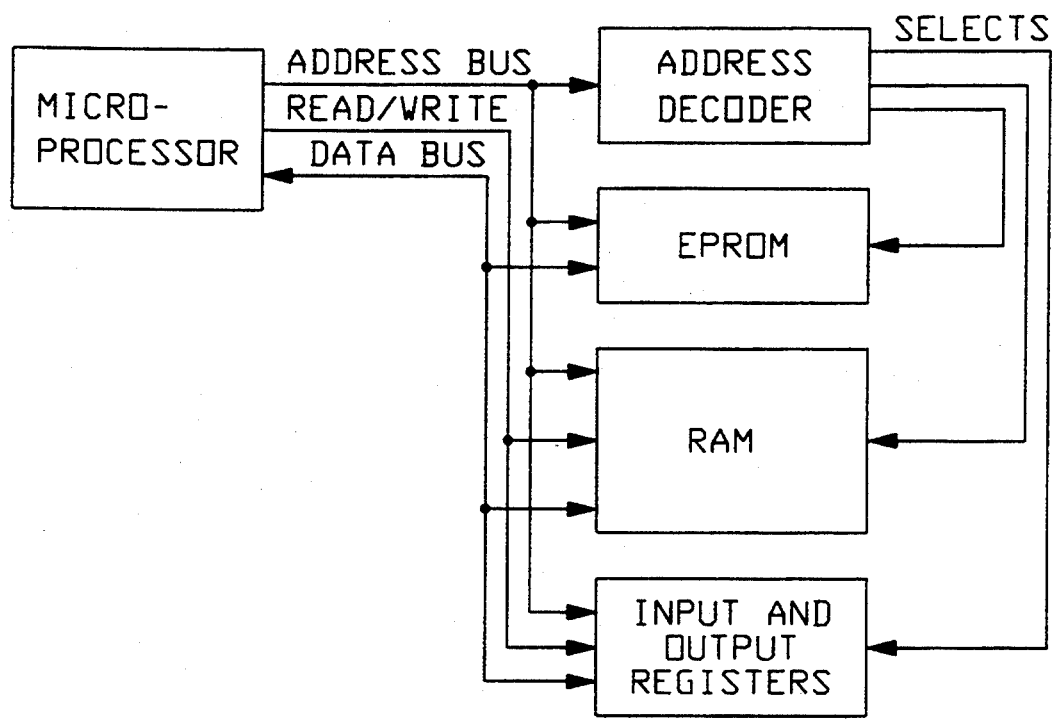
FIG. 1 is a schematic idealized block diagram of a disk drive controller of a "Control" type this being modified in the like diagram of FIG. 2 according to a feature hereof.

A block diagram of a control type of intelligent controller is shown in FIG. 1.

The control program for the controller is stored in EPROM. A RAM is used to store temporary values generated by the execution of the control program. The output registers are connected to the machine to be controlled and are used to affect changes in the machine. The input registers are connected to the machine to be controlled and are used to monitor various signals produced by the machine. The microprocessor executes the control program stored in the EPROM. The address bus is generated by the microprocessor and is used to specify a unique location in the EPROM, RAM or a particular input or output register. The data bus is used to transfer data between the addressed device and the microprocessor. The read/write signal specifies the direction of the data transfer, to or from the microprocessor. The address decoder logic generates "select" or "enable" signals for the EPROM, RAM, input and output registers to enable the transfer of data. There are a number of different methods in use for implementing the address decoding function; however, the objective of these methods is to ensure that only one device is transferring data to the data bus, or receiving data from the data bus, at a time. In particular, when the microprocessor is writing data to an output register or reading data from an input register the RAM is not "selected".

The invention differs from the system described in that the address decoding function is designed so that when the microprocessor writes to an output register, the data transferred is simultaneously written to a unique location in the RAM. Also, when the microprocessor reads data from an input register the data is simultaneously written to a unique location in the RAM. This requires that the read/write function of the RAM is controlled by the address decoding logic. Further, the address decoding logic allows the microprocessor to read the contents of the RAM to determine the data written to the output register, or read from the input register. In the present implementation of the invention, the input and output registers are grouped as one of three types, "write-only registers", "read-only registers", and "read/write registers". A specific location in the RAM is reserved for each of the input and output registers and the read/write function of the RAM is controlled as tabulated below (Table I). Thus, writes to the write-only registers, for instance, result in a write to the "shadow RAM", as well as to the I/O register; while a read from a write-only register results in the contents of the "shadow RAM" being transferred to the processor. This allows the processor to "read" write-only registers without having to save an image of them, thereby making it easier to update single bits in a register without affecting the other bits.

TABLE I

| Microprocessor Address | R/W | Register Type | Register Select | RAM R/W | RAM Select |
|---|---|---|---|---|---|
| 2000-203F | R | Read/Write | Enable | W | Enable |
| 2040-205F | R | Read Only | Enable | W | Enable |
| 2060-207F | R | Write Only | Enable | R | Enable |
| 2000-203F | W | Read/Write | Enable | W | Enable |
| 2040-205F | W | Read Only | Disable | W | Enable |
| 2060-207F | W | Write Only | Enable | W | Enable |

The "address map" of the controller is shown below (preferred):

| Microprocess Address | Device Type |
|---|---|
| 0000-1FFF | RAM |
| 2000-207F | Input and output registers |
| 4000-FFFF | EPROM |

The data written into the RAM by writing data to the output registers at addresses 2060-207F may be examined by reading from addresses 2060-207F or from addresses 0060-007F which correspond to RAM locations 0060-007F. The data written into the RAM by reading from the input registers at addresses 2000-205F may be examined by reading from addresses 0000-005F which correspond to RAM locations 0000-005F. The address decoding scheme is implemented using programmable logic devices.

Workers will perceive that this is a new and unusual address decoding function. For instance, the controller is made to automatically write into the RAM any time it writes into the output register (into locations in RAM dedicated to the output register). Also, whenever data is read from the input register, it is automatically recorded in a prescribed location in RAM.

For example, if the microprocessor writes XXYY into the output register, it will record this in RAM as well. Then, later when the processor initiates a read to the output register, the address decoder can direct it to the selected, associated RAM location—and it will appear that the output register is being read. Workers will appreciate how much convenience this gives to a programmer who may now reference the same memory locations writing to the output register and reading its image.

One problem addressed here is the occasion when such a microprocessor presents data to the output register and later needs to recall it, there is no convenient, known way to initiate such a read (from a write-only device). Heretofore, it has been suggested that one somehow AA: tie input register locations to associated output register locations; or BB: the microprocessor store the same data in a RAM for such later access—but this requires more complex overhead (added instruction bits), etc.

Workers will appreciate the unusual simplicity and other advantages of the instant technique, above described.

Figure 6:
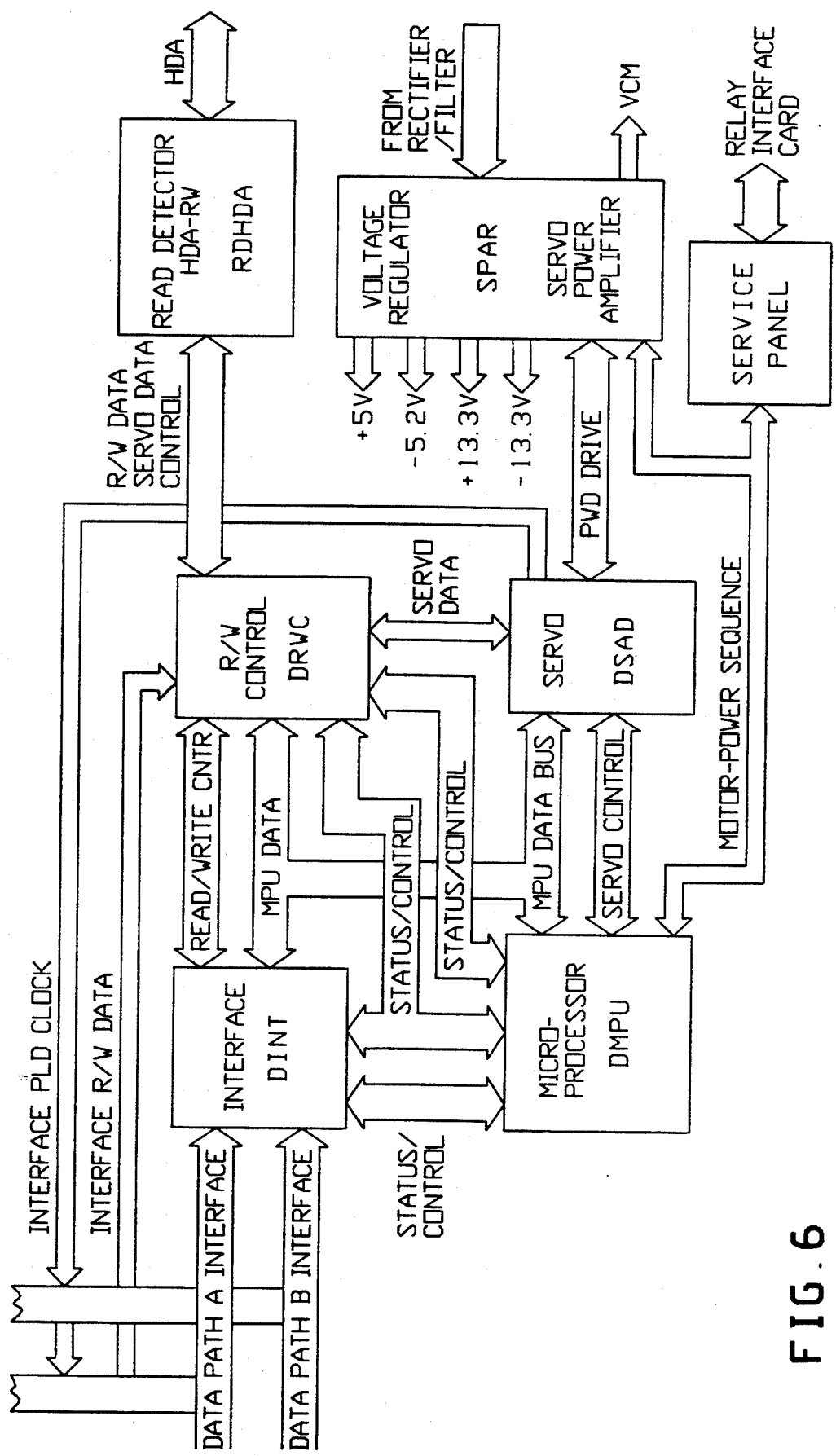
FIG. 6 is a schematic block diagram of an overall disk drive logic block apt for using the embodiment (cf. DMPU).

FIG. 6 shows a control logic block (e.g., one such for each disk drive actuator unit) apt for using the instant invention (which will be associated with microprocessor stage DMPU and communicate with interface DINT, as workers will understand).

ALTERNATE METHODS OF CONSTRUCTION

The described invention implies that the input and output registers are "memory mapped". Some microprocessors have separate addressing for memory (EPROMs and RAMs) and input/output registers; the invention could also be applied to these type of controllers, as workers will appreciate.

Key features of this invention are that:
(1) Data written to an output register is simultaneously written to a RAM location.
(2) Data read from an input register is simultaneously written to a RAM location.
(3) The data may be read directly from the RAM to determine the data previously written to an output register or read from an input register.
(4) The same memory address may be used for writing data to an output register and reading the corresponding RAM location.

CONCLUSION

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to other types of disk files, as well as to related systems. Also, the present invention is applicable for enhancing other controller means.

The above examples of possible variations of the present invention are merely illustrative. Accordingly, the present invention is to be considered as including all possible modifications and variations coming within the scope of the invention as defined by the appended claims.

What is claimed is:

1. In apparatus for controlling a disk drive control arrangement, this apparatus including microprocessor means, input register means connected between the disk drive and the microprocessor means, and output register means connected between the disk drive and the microprocessor means, the combination therewith of:
   image RAM memory means connected directly to the microprocessor means and adapted to contemporaneously store an "image" of data written to said output register means and of data read from said input register means; without affecting either register means; and
   image-addressing means connected with said microprocessor means, with said input register means, with said output register means and with said image-RAM memory means, and being adapted to select store-locations in said image RAM memory means.

2. The invention of claim 1 including logic means designed and arranged so that a write operation to output register means automatically results in a contemporaneous write operation to a corresponding location reserved in the RAM means to effect said "image".

3. The invention of claim 2 wherein an address decoding function is included in said addressing means, being designed and arranged so that, when the microprocessor means writes to an output register means, the data so transferred is contemporaneously written in said RAM means at a respective "image location" reserved in the RAM means for such data.

4. The invention of claim 1 wherein the system is controlled so that, when the microprocessor means reads data from an input register means, the data is automatically and contemporaneously written to an associated location in the RAM means at a respective "image location" therein reserved for such data.

5. The invention of claim 4 wherein the read/write functions of said RAM means are controlled by the address-decoding logic in the address means.

6. The invention of claim 1 wherein address-decoding logic is included in said addressing means and is designed and adapted to allow the microprocessor means to read prescribed memory location contents in the RAM means to ascertain the data written to the output register means or to ascertain the data read from said input register means.

7. The invention of claim 6, wherein said input and output register means are either: "write-only registers", "read-only registers" or "read/write registers".

8. The invention of claim 7 wherein specific respective memory locations are reserved in the RAM means for each respective register; and wherein the read/write functions of the RAM means are controlled therefor.

9. The invention of claim 8 wherein write operations to a "write-only" output register result in an identical write operation to the RAM means, while a read operation from a "write-only" output register results in an automatic transfer of associated contents of the RAM means to the microprocessor, thereby relieving the microprocessor of the need to "save" an image thereof.

10. The invention of claim 1 wherein said microprocessor is made to automatically write an "image" to certain "output ones" of said RAM locations whenever it writes into the output register means and also to automatically write an "image" to certain "input ones" of said RAM locations whenever it reads from an input register means.

11. A method of controlling information associated with a disk drive using a controller arrangement including microprocessor means and associated input register means and output register means; this method including
providing image-RAM means for storing an "image" of data written to said output register means; allocating "input-memory" and "output-memory" sites in the image RAM means to said input register and output register means, respectively;
adapting the controller arrangement to simultaneously WRITE to said output register means and said image-RAM means; and
providing "image-RAM-addressing means" coupled with said microprocessor means, with both said register means and with said image-RAM means, and operating it to help said microprocessor means to automatically store an "image" in respective ones of said "sites" in said RAM means of data written to the output register means or data read from the input register means.

12. The method of claim 11 wherein said microprocessor and RAM means are designed and arranged for data to be read directly from the RAM means to determine data previously written to output register means or data previously read from input register means.

13. The invention of claim 12 wherein said microprocessor and RAM means are designed and arranged so that the same memory address may be used for writing data to output register means and reading the corresponding "site" in said RAM means.

14. The method of claim 11 wherein a control program for said microprocessor means is stored in a prescribed EPROM,
wherein said RAM means is used to store temporary values generated by said control program; and
wherein said addressing means comprises a decoder logic unit adapted to generate enable signals for said RAM means, said EPROM and said register means to enable transfer of data.

15. The method of claim 11 including the steps of:
coupling said input register means in input relation with said RAM and microprocessor means, and in output relation with said utilization means; and
coupling said output register means in output relation with said RAM and microprocessor means, and in input relation with said utilization means.

16. A method controlling the flow of information between utilization means, microprocessor means and associated input register means and output register means; this method including providing image-RAM means for storing an "image" of data written to said output register means; allocating "input-memory" and "output-memory" sites in the image-RAM means to said input register and output register means, respectively;
arranging to simultaneously WRITE to said output register means and to said image-RAM means;
coupling said input register means in input relation with said RAM and microprocessor means, and in output relation with said utilization means;
coupling said output register means in output relation with said RAM and microprocessor means, and in input relation with said utilization means;
providing "image-RAM-addressing means" coupled with said microprocessor means, with said input register means, with said output means and with said image-RAM means, while operating to help said microprocessor means to automatically store an "image" in respective ones of said "sites" in said RAM means of data written to the output register means or data read from the input register means.

17. In an apparatus for controlling the flow of information between utilization means, microprocessor means, input register means connected between the utilization means and the microprocessor means, and output register means connected between the utilization means and the microprocessor means, the combination therewith of:
image RAM memory means connected directly to the microprocessor means and adapted to contemporaneously store an "image" of data written to said output register means and of data read from said input register means, without affecting either register means; and
image-addressing means connected with said microprocessor means, said input register means, said output register means and said image-RAM memory means, and being adapted to select store-location in said image RAM memory means.

18. The invention of claim 17 including logic means designated and arranged so that a write operation to output register means automatically results in a contemporaneous write operation to a corresponding location reserved in the RAM means to effect said "image".

19. The invention of claim 17 wherein the system is controlled so that, when the microprocessor means reads data from an input register means, the data is automatically and contemporaneously written to an associated location in the RAM means at a respective "image location" therein reserved for such data.

20. The invention of claim 17 wherein address-decoding logic is inclined in said addressing means and is designed and adapted to allow the microprocessor means to read prescribed memory location contents in the RAM means to ascertain the data written to the output register means or to ascertain the data read from said input register means.

21. The invention of claim 17 wherein said microprocessor is made to automatically write an "image" to certain "output ones" of said RAM locations whenever it writes into the output register means and also to automatically write an "image" to certain "input ones" of said RAM locations whenever it reads from an input register means.

22. A method enhancing a disk drive and associated controller arrangement including microprocessor means, and associated input register means and output register means; this method comprising:

adding "image-RAM" means having memory allocated to said input register means and to said output register means; coupling said input register means to input said RAM means and said microprocessor means, and as output from the disk drive; coupling said output register means to input the disk drive, and as output from said RAM means and the microprocessor means; coupling image-RAM addressing means to said microprocessor means, to said RAM means and to both said register means; and arranging for simultaneous WRITE to both said RAM means and said output register means, whereby said microprocessor means will automatically store, in said RAM means, an image of any data written to said output register means, or read from said input register means.

23. In apparatus for controlling a data transfer control arrangement, this apparatus including microprocessor means, input register means connected between a control node and said microprocessor means, and output register means connected between said control node and said microprocessor means, the combination therewith of:

image memory means connected directly to said microprocessor means and adapted to effect "data imaging" by contemporaneously storing an "image" of data written to said output register means and of data read from said input register means, without affecting either said register means; and image-addressing means connected with said microprocessor means, with said input register means, with said output register means and with said image-RAM memory means, and adapted to selected store-locations in said image RAM memory means and so facilitate said "data imaging".

24. A method of controlling information associated with a data transfer controller arrangement including microprocessor means and associated input register means and output register means; this method including providing image-memory means for storing an "image" of data written to said output register means; allocating "input-memory" and "output-memory" sites in said image-memory means to said input register and output register means, respectively;

adapting this controller arrangement to simultaneously WRITE to said output register means and said image-memory means;

coupling said input register means in input relation with said image-memory means and said microprocessor means, and in output relation with said transfer controller arrangement;

coupling said output register means in output relation with said image-memory means and said microprocessor means, and in input relation with said transfer controller arrangement; and providing image-memory-addressing means coupled with said microprocessor means, with both said register means and with said image-memory means, and operating said addressing means to help said microprocessor means to automatically store an "image" in respective ones of said "sites" in said image-memory means of data written to said output register means of data read from said input register means.

* * * * *